United States Patent
Badri et al.

(10) Patent No.: US 10,338,267 B2
(45) Date of Patent: Jul. 2, 2019

(54) FORMATION PROPERTIES FROM TIME-DEPENDENT NUCLEAR MAGNETIC RESONANCE (NMR) MEASUREMENTS

(71) Applicant: SCHLUMBERGER TECHNOLOGY CORPORATION, Sugar Land, TX (US)

(72) Inventors: Mohammed Badri, Al-Khobar (SA); Andrea Valori, Al-Khobar (SA); Wael Abdallah, Dhahran (SA); Reza Taherian, Al-Khobar (SA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1142 days.

(21) Appl. No.: 14/576,648

(22) Filed: Dec. 19, 2014

(65) Prior Publication Data
US 2016/0178786 A1    Jun. 23, 2016

(51) Int. Cl.
*G01V 3/32* (2006.01)
*G01V 3/38* (2006.01)

(52) U.S. Cl.
CPC . *G01V 3/32* (2013.01); *G01V 3/38* (2013.01)

(58) Field of Classification Search
CPC ........ G01R 33/448; G01R 33/46; G01V 3/14; G01V 3/32; G01V 3/38; E21B 43/16; E21B 43/162; E21B 43/164; E21B 43/166; E21B 43/168; E21B 43/18; E21B 49/008; E21B 49/087; E21B 49/088
USPC ........ 324/303, 346; 73/78, 152.05; 166/90.1
See application file for complete search history.

(56) References Cited

U.S. PATENT DOCUMENTS

| 4,353,249 | A | * | 10/1982 | Lagus | E21B 47/10 73/152.31 |
|---|---|---|---|---|---|
| 5,233,866 | A | * | 8/1993 | Desbrandes | E21B 49/10 73/152.05 |
| 5,265,015 | A | * | 11/1993 | Auzerais | E21B 49/10 702/12 |
| 5,282,384 | A | | 2/1994 | Holbrook | |
| 5,803,186 | A | * | 9/1998 | Berger | E21B 21/103 166/250.17 |

(Continued)

OTHER PUBLICATIONS

International Search Report and Written Opinion for corresponding PCT Application No. PCT/US2015/064377, dated Feb. 22, 2016, 11 pages.

*Primary Examiner* — Jeff W Natalini
*Assistant Examiner* — Steven L Yeninas (57) ABSTRACT

A NMR logging tool is provided and disposed in a wellbore at some desired depth. Packers are provided and actuated to hydraulically isolate a section of the wellbore and form a cavity between the NMR logging tool and the wall of the isolated section of the wellbore. The cavity is evacuated until a first desired pressure within the cavity is attained. Fluid is injected into the cavity until a second desired pressure within the cavity is attained. A plurality of NMR measurements is made on the region of the formation, each of the plurality of measurements being made at different times. Formation properties are inferred using the measurements. A baseline NMR measurement may be made when a first desired pressure is attained. A time-zero NMR measurement may be made when a second desired pressure is attained. Similar measurements may be made in a laboratory on a sample.

23 Claims, 5 Drawing Sheets

(56) References Cited

U.S. PATENT DOCUMENTS

| | | | | |
|---|---|---|---|---|
| 6,528,995 | B1* | 3/2003 | Speier | G01N 24/081 |
| | | | | 324/303 |
| 6,856,132 | B2* | 2/2005 | Appel | G01V 3/32 |
| | | | | 324/303 |
| 6,932,155 | B2* | 8/2005 | Vinegar | B09C 1/02 |
| | | | | 166/245 |
| 7,054,751 | B2* | 5/2006 | Craig | E21B 49/008 |
| | | | | 702/13 |
| 7,221,158 | B1* | 5/2007 | Ramakrishnan | G01N 24/081 |
| | | | | 324/300 |
| 8,297,354 | B2* | 10/2012 | Ayan | E21B 33/1243 |
| | | | | 166/250.15 |
| 2002/0112854 | A1* | 8/2002 | Krueger | E21B 47/06 |
| | | | | 166/250.07 |
| 2004/0055745 | A1* | 3/2004 | Georgi | E21B 49/00 |
| | | | | 166/250.02 |
| 2005/0116709 | A1* | 6/2005 | Proett | G01N 24/081 |
| | | | | 324/303 |
| 2008/0066535 | A1* | 3/2008 | Vasques | E21B 33/1246 |
| | | | | 73/152.17 |
| 2010/0058854 | A1* | 3/2010 | Waters | E21B 49/008 |
| | | | | 73/152.41 |
| 2010/0264915 | A1* | 10/2010 | Saldungaray | E21B 43/16 |
| | | | | 324/303 |
| 2010/0277167 | A1* | 11/2010 | Romero | G01N 24/081 |
| | | | | 324/303 |
| 2011/0068787 | A1* | 3/2011 | Freedman | E21B 7/046 |
| | | | | 324/303 |
| 2011/0198078 | A1* | 8/2011 | Harrigan | E21B 49/008 |
| | | | | 166/254.2 |
| 2013/0002258 | A1 | 1/2013 | Ligneul et al. | |
| 2014/0000358 | A1 | 1/2014 | Badri et al. | |

* cited by examiner

FORMATION PROPERTIES FROM TIME-DEPENDENT NUCLEAR MAGNETIC RESONANCE (NMR) MEASUREMENTS

BACKGROUND OF THE DISCLOSURE

Nuclear Magnetic Resonance (NMR) tools used for well-logging and downhole fluid characterization measure the response of nuclear spins in formation fluids to applied magnetic fields. Downhole NMR tools typically have a permanent magnet that produces a static magnetic field at a desired test location (e.g., where the fluid is located). The static magnetic field produces a magnetization in the fluid. The magnetization is aligned along the direction of the static field. The magnitude of the induced magnetization is proportional to the magnitude of the static field. A transmitter antenna produces a time-dependent radio frequency magnetic field that has a component perpendicular to the direction of the static field. The NMR resonance condition is satisfied when the radio frequency is equal to the Larmor frequency, which is proportional to the magnitude of the static magnetic field. The radio frequency magnetic field produces a torque on the magnetization vector that causes it to rotate about the axis of the applied radio frequency field. The rotation results in the magnetization vector developing a component perpendicular to the direction of the static magnetic field. This causes the magnetization vector to precess around the static field at the Larmor frequency. At resonance between the Larmor and transmitter frequencies, the magnetization is tipped to the transverse plane (i.e., a plane normal to the static magnetic field vector). A series of radio frequency pulses are applied to generate spin echoes that are measured with the antenna.

NMR measurements can be used to estimate, among other things, formation porosity. For example, the area under the curve of a T2 distribution for a NMR measurement can be equated to or at least provides an estimate of the NMR-based porosity. The T2 distribution may also resemble the pore size distribution in water-saturated rocks. The raw reported porosity is provided by the ratio of the initial amplitude of the raw decay and the tool response in a water tank. This porosity is independent of the lithology of the rock matrix.

It has been previously suggested to use NMR measurements with different depths of investigation (DOIs) to measure the pore pressure of tight (low permeability) formations, such as shale gas. NMR measurements are made while gas is injected into the subset of pores that are in fluid communication with the borehole through drilling-induced fractures. The data is compared with a deeper-looking NMR signal that samples pores that are not affected by the drilling-induced micro-fractures and are only in fluid communication with the borehole through the natural permeability of the formation (which is too low to allow much gas movement). Taking the deeper-looking NMR signal as a measure of the unknown gas pressure, the shallower-looking NMR signal is adjusted by varying the gas pressure in the borehole until the two measurements are equal. The known borehole gas pressure is then assumed to be equal to the unperturbed gas pressure in the formation.

The typical laboratory technique for direct permeability measurement is to flow a fluid through a formation sample, thereby inducing a pressure gradient ΔP across the sample and measuring the fluid flux q. For a fluid of unit viscosity, these quantities are related to the sample permeability, k, through Darcy's law:

$$k = \frac{q}{\Delta P} \quad (1)$$

Thus, the permeability of the sample can be determined if the pressure gradient and the fluid flux are known. If the fluid is other than water, then the right hand side of Eq. (1) is multiplied by the fluid viscosity.

SUMMARY

In an embodiment, a NMR logging tool is provided and disposed in a wellbore at some desired depth. Packers are provided and actuated to hydraulically isolate a section of the wellbore and form a cavity between the NMR logging tool and the wall of the isolated section of the wellbore. The cavity is evacuated until a first desired pressure within the cavity is attained. Fluid is injected into the cavity until a second desired pressure within the cavity is attained. A plurality of NMR measurements is made on the region of the formation, each of the plurality of measurements being made at different times. Formation properties are inferred using the measurements. A baseline NMR measurement may be made when a first desired pressure is attained. A time-zero NMR measurement may be made when a second desired pressure is attained. Similar measurements may be made in a laboratory on a sample.

In a further embodiment, a system is disclosed which comprises a nuclear magnetic resonance (NMR) logging tool disposed in a wellbore at some desired depth. The system includes an upper packer and a lower packer. A processor is located at the earth's surface or carried on the NMR logging tool and is capable of actuating the upper packer and the lower packer to hydraulically isolate a section of the wellbore and form a cavity between the NMR logging tool and the wall of the isolated section of the wellbore. The cavity is evacuated until a first desired pressure within the cavity is attained and fluid is injected into the cavity until a second desired pressure within the cavity is attained. A plurality of NMR measurements are obtained using the NMR logging tool on a region of a formation penetrated by the wellbore and adjacent the isolated section of the wellbore, each of the plurality of measurements being made at different times; and one or more properties of the formation are inferred using the plurality of NMR measurements.

In an embodiment, a system is disclosed comprising a source of pressurized fluid, a housing, and a sleeve mounted on an inner surface of the housing, and a sample having a lateral surface and two end surfaces. The lateral surface is sealingly disposed in the interior of the sleeve and the pressurized fluid can be made to bear on one of the two end surfaces. A nuclear magnetic resonance (NMR) tool is disposed so as to have a region of investigation that encompasses the sample.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Embodiments are described with reference to the following figures. The same numbers are generally used throughout the figures to reference like features and components.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate. It will also be understood that, although the terms first, second, etc. may be used herein to describe various elements, these elements should not be limited by these terms. These terms are only used to distinguish one element from another.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A system and method to determine the permeability and/or pore pressure of a rock (formation) based on its time-dependent nuclear magnetic resonance (NMR) response is disclosed herein. NMR measurements are sensitive to the protons (hydrogen nuclei) which are found in the structure of hydrocarbons (e.g., oil and gas) as well as water. As a result of NMR sensitivity to the protons present in the gas molecules, time-dependent NMR responses can be used to measure the gas pressure in the pore space of "tight" formations (i.e., formations of low permeability). That is, the NMR signal can be calibrated to provide the gas pressure in the pore space. It is desired to measure the gas permeability in tight formations such as shale gas formations or tight, gas-bearing carbonates, both of which typically have gas permeabilities on the order of nano-Darcies. These formations usually do not produce any significant volume of gas until they are fractured. In the case of shale gas, the gas pressure in the pore space can be up to 5000 psi, yet the low permeability of the shale prevents any significant amount of gas to flow to the borehole. This is especially true if the well is filled with drilling fluids at pressures comparable to the pore pressures.

Gas may be injected under downhole conditions while measuring NMR as a function of time. Due to the low permeability of the shale or tight carbonate formations, the NMR signal from the gas in the pore space will not increase instantaneously. Rather, it takes a relatively long time (typically hours) for the signal to build up, which allows many separate measurements to be made as a function of time. The time dependence of the signal is recorded and processed to determine the permeability of the formation. Pores that are in fluid communication with the borehole through micro-cracks give rise to an NMR signal in a relatively short time period. The time it takes for this signal to build up is related to the permeability of the micro-cracks, which have a much higher permeability than the pores in an unperturbed state whose only paths to the borehole is through the natural, low permeability passageways. Thus, the (relatively) fast NMR signal build up from micro-cracks may be used to discriminate against them (i.e., remove their contribution).

Figure 1:
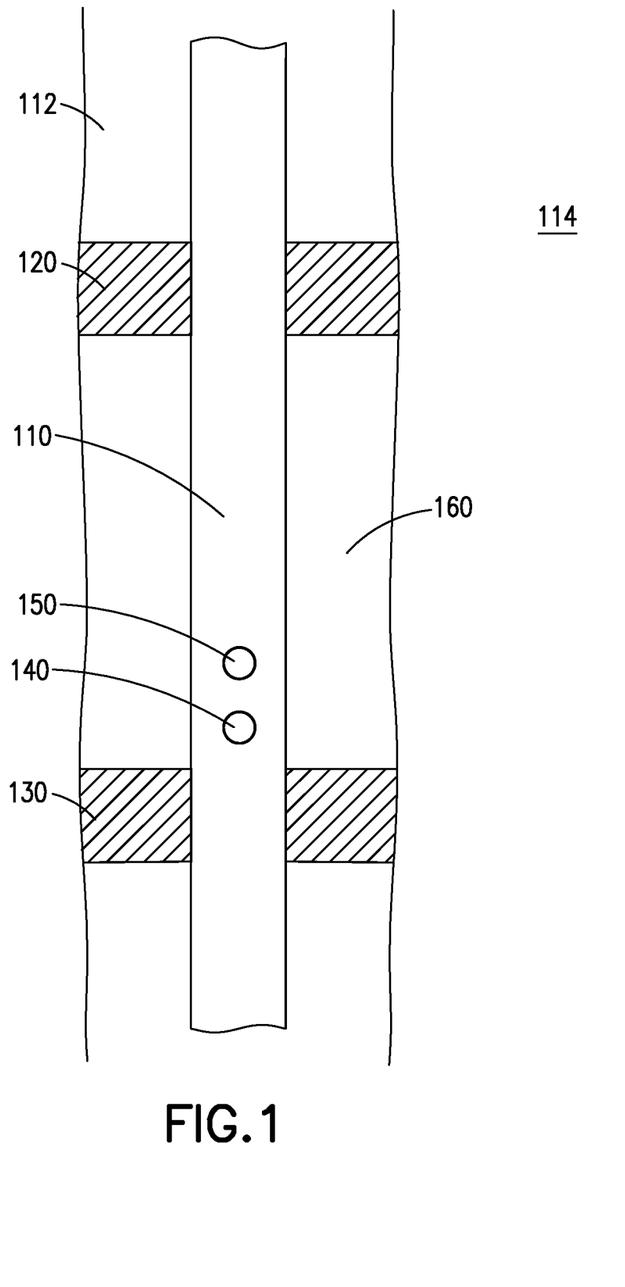
FIG. 1 is a schematic drawing of a NMR logging tool disposed in a wellbore, in accordance with the present disclosure.

FIG. 1 schematically shows an embodiment in which a NMR logging tool 110 is disposed in a wellbore 112 adjacent a downhole formation 114. That is, logging tool 110, along with some means for determining depth such as a gamma ray tool (not shown), is lowered into borehole 112. (The depth of logging tool 110 is known from the depth determining means. For example, if a gamma ray tool is used, the gamma ray signal is monitored as a function of depth and logging tool 110 is lowered to some desired depth.) Logging tool 110 also carries an upper packer 120 and a lower packer 130 that are actuated once logging tool 110 is placed at the desired depth. This causes the space (cavity) 160 between the two packers 120, 130 to be hydraulically isolated from the remainder of wellbore 112. As part of logging tool 110, and located within space 160 between the two packers 120, 130, there is an evacuation valve 140 connected to a pump that can be used to evacuate the fluid in space 160. Logging tool 110 also carries an injection valve 150 through which gas can be injected into cavity 160. If desired, a pressure gauge can be provided to provide a measurement of the pressure within cavity 160.

While evacuation valve 140 is typically located near the lower end of cavity 160, injection valve 150 can be located most anywhere in cavity 160, though better performance may be expected if located near the upper end of space 160. With that arrangement the pressure of the injected gas, in a vertical well for example, can be used to push the fluid in cavity 160 down and help with the pump-out operation. In some embodiments evacuation valve 140 and injection valve 150 may be the same. The gas can be supplied from uphole or it may be from a high pressure gas canister carried in the tool string containing NMR logging tool 110. Once cavity 160 is evacuated, a background NMR measurement is performed which provides a response from any gas (fluid) already present in the pore space of the rock formation. Then cavity 160 is filled with gas until some desired pressure is attained. Soon after the gas reaches the desired pressure, another NMR measurement is performed to mark the signal at "time-zero". The time-zero and background NMR measurements are not considered time-dependent and are not indicative of the rate of gas flow into the formation. Note that NMR logging tool 110 has a sensitivity region that does not extend to/from the surface of NMR logging tool 110. Rather, NMR logging tool 110 is designed to be sensitive to a region that starts some radial distance away from the surface of NMR logging tool 110, leading to a "dead zone". That is, the gas in cavity 160 does not contribute to the NMR response obtained from the sensitivity region of NMR logging tool 110.

The NMR signal intensity is proportional to the hydrogen index (i.e., the number of protons per unit volume normalized to the same quantity for water). The hydrogen index of water is one, while that of oil(s) is less than one but varies in a small range depending on the composition of the oil. The hydrogen index of gas (methane, for example) depends on the pressure. As the pore space is filled with gas molecules pumped into that constant volume, the pressure, and thus the hydrogen index, increases. The NMR signal from a gas sample at low pressures (less than 100 psi) is generally too weak to detect. At gas pressures above 1000 psi, however, the NMR signal is intense and can readily be measured.

Figure 2:
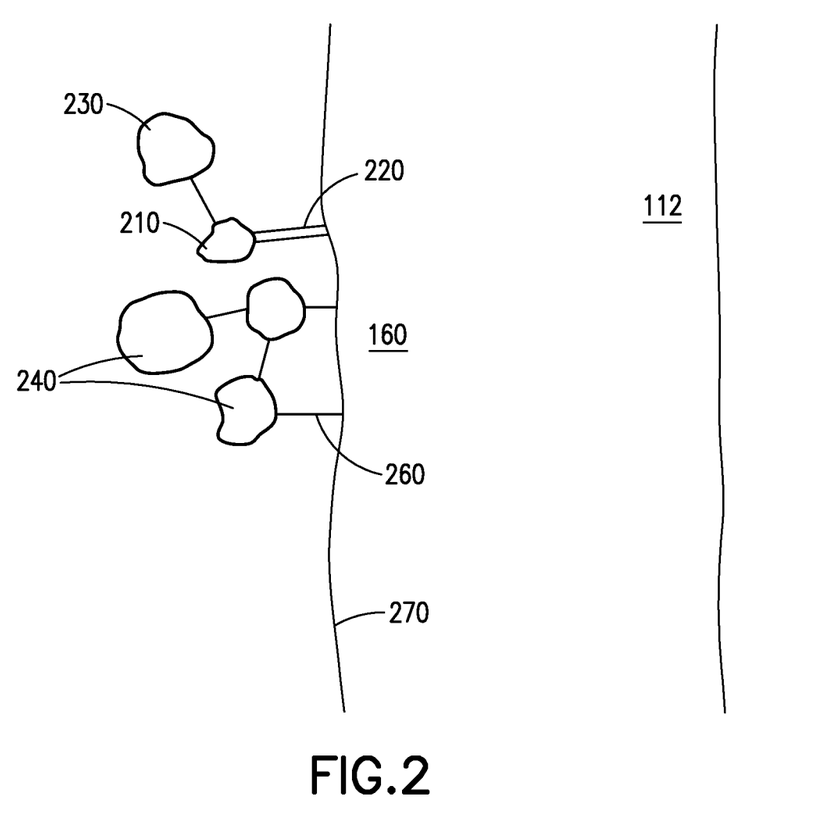
FIG. 2 is a schematic drawing of pores in a formation adjacent the wellbore of FIG. 1, in accordance with the present disclosure.

FIG. 2 is a schematic drawing of pores in the vicinity of wellbore 112. As FIG. 2 shows, some pores 210 within the depths of investigation (DOIs) of NMR logging tool 110 are connected to the borehole wall 270 through induced microcracks 220 (induced by the drilling of the well, for example). Of interest here, however, are the subset of pores 240 whose permeability is not affected by the drilling operation. Rather, they are connected to the borehole wall 270 through the original, low permeability paths 260. Below, we consider four operational scenarios.

In a first scenario, pores 240 remain at the formation pressure $P_0$. This occurs when the drilling fluid in wellbore 112 produces a hydrostatic pressure that is substantially equal to the formation pressure. Since the formation pressure is typically 5000 psi or less, the drilling fluid can be designed to have an appropriate density so as to achieve such borehole pressures. Similarly, the injection gas pressure $P_2$ may equal the formation pressure. In this case, the pressure difference $\Delta P$ in Eq. (1) is zero and there is no net flow, leaving the pore pressure intact. Alternatively, this case may temporarily arise if the borehole pressure (i.e., injection gas pressure or hydrostatic pressure) is different from the formation pressure, but the measurement is performed soon after the drilling operation. In that case, the higher pressure fluid has not had a chance to move and the pore pressure is, at that time, still at the formation pressure.

In a second scenario, the pressure in pores 240 is increased above the original formation pressure $P_0$. This can occur, for example, when the gas injection pressure $P_2$ is greater than the formation pressure $P_0$ and the higher pressure gas has invaded pores 240.

In a third scenario, the injection gas pressure $P_2$ is less than the pore pressure $P_0$ and the formation fluids are being produced, but pores 240 are not completely empty. This is generally the most common operational situation.

The fourth scenario encompasses the case where pores 240 are substantially empty. This can happen if there is a long time between the drilling and the taking of the NMR measurement and the borehole pressure is less than the formation pressure. Even if the permeability is low, given enough time the formation fluid (gas) will be produced.

As gas is injected into space 160 (between packers 120, 130), an NMR signal is generated with a time dependence that depends on which of the above scenarios is actually occurring. If the injected pressure is equal to the pore pressure ($P_2=P_0$, scenario 1), the NMR signal does not change with time. If the injected pressure is higher than the pore pressure ($P_2>P_0$, scenario 2), then the NMR signal will increase with time. If the injection pressure is lower than the pore pressure ($P_2<P_0$, scenario 3), the NMR signal will decrease with time.

For the best signal-to-noise ratio for the measurement, it is desirable to have sufficiently high enough injection pressures so that the NMR signal increases with time. Thus, the NMR signal can be monitored and, if it is not increasing with time, the injection pressure $P_2$ may be increased. To determine the permeability, a $\Delta P$ greater than zero is induced (i.e., the injected pressure is higher than the formation pressure).

Figure 3:
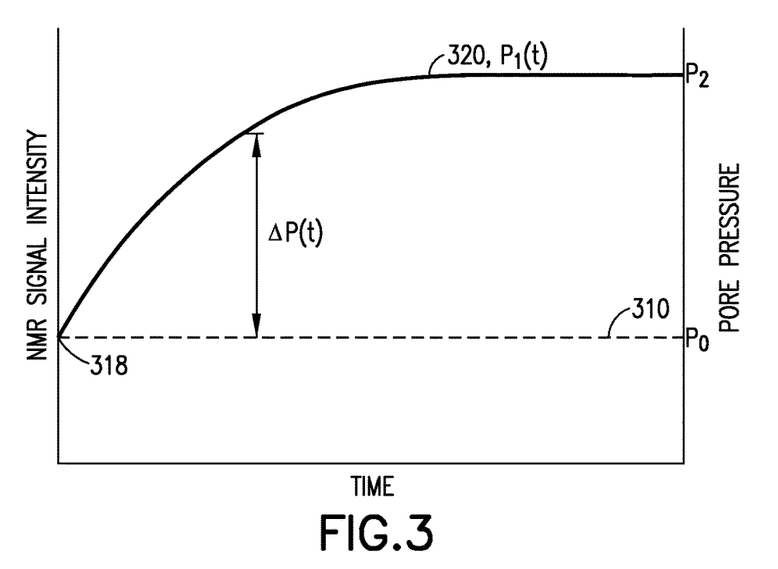
FIG. 3 is a plot of NMR signal intensities and pore pressures as functions of time, in accordance with the present disclosure.

FIG. 3 is a plot showing the time dependence of the NMR signal when gas is injected into cavity 160 with gas pressure $P_2$. First trace 310 results when the injection pressure $P_2$ and the native pore pressure ($P_0$) are the same ($P_2=P_0$, scenario 1). In this case, there is no time dependence in the NMR signal and the injection pressure is a measure of pore pressure. Thus, the permeability is not determined for this case, but the pore pressure is.

Second trace 320 ($P_1(t)$) results when the injection pressure $P_2$ is increased to a new value greater than the pore pressure $P_0$ ($P_2>P_0$, scenario 2). The NMR signal increases initially, but eventually approaches an asymptotic value as the pressure in pores 240 approaches $P_2$. (Note that in all traces of FIG. 3 the initial "spurt" signal due to microfractures is not shown.) The initial NMR intensity 318

($P_1(0)$) is a measure of pore pressure $P_0$, as was the case for the first trace 310. The time dependence of $P_1(t)$ may be analysed to determine the permeability, as follows.

At each point in time, $\Delta P(t)$ is defined as:

$$\Delta P(t) = P_1(t) - P_0 \qquad (2)$$

The NMR signal $S(t)$ is proportional to the pressure of the gas in the pore space:

$$S(t) = mP_1(t) \qquad (3)$$

where m is a known proportionality constant. This relation is the basis of having both NMR intensity and pore pressure in FIG. 3, as they scale with one another. Differentiating Eq. (3) and noting that the time dependence of $P_1$ is a result of and an indication of gas influx:

$$\frac{d}{dt}S(t) = m\frac{d}{dt}P_1(t) = mq \qquad (4)$$

Substituting into Eq. (1):

$$k = \frac{1}{(P_1 - P_0)}\frac{1}{m}\left[\frac{d}{dt}S\right] \qquad (5)$$

The parameters in Eq. (5) can be determined from the data in FIG. 3 and used to calculate the sample permeability.

Figure 4:
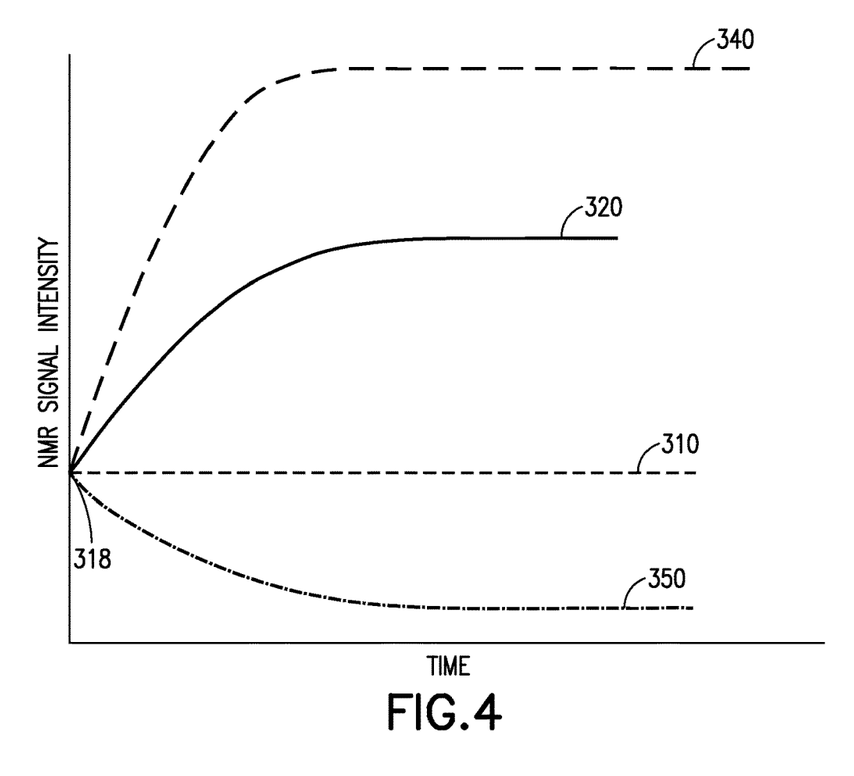
FIG. 4 is a plot of the NMR signal intensities and pore pressures of FIG. 3, as well as the NMR signal intensities and pore pressures as functions of time for different desired pressures, in accordance with the present disclosure.

FIG. 4 is a plot showing the curves 310, 320 of FIG. 3, but, in addition, shows third trace 340 and fourth trace 350. The third trace 340 results when the injected gas pressure is higher than that used to produce second trace 320 (another scenario 2 case). The higher pressure leads to stronger signal that stabilizes faster. Second trace 320 and third trace 340 are two curves from a family of curves for which the applied (injected) gas pressure varies.

For the pores 240 that are not yet emptied by drilling, one may measure the NMR signal without applying external gas pressure in the wellbore and repeat the NMR measurement as a function of time to monitor the gas pressure decrease (an embodiment of scenario three). An example of this is shown by fourth trace 350 in FIG. 4. The time-dependent decrease in NMR signal intensity is a result of the low permeability of the formation, and the time dependence can be used to quantify the permeability using Eq. (5) above, wherein the pressure dependence of $P_1$ and the NMR signal are negative.

In scenario 4, in which there is no gas in the pore space, the only way to produce an NMR signal is to inject pressured gas into cavity 160 at sufficiently high pressures for the injected gas to enter pores 240, and perform measurements as pores 240 fill with gas. The time-dependent NMR signal will resemble second trace 320 and third trace 340 in FIGS. 3 and 4, except the new trace will start at zero NMR signal intensity since the pores are initially substantially devoid of protons.

Scenario 3 is similar to scenario 4 and a family of traces analogous to second and third traces 320, 340 can be generated by adjusting the injection gas pressure. However, unlike the scenario 4 traces, the traces for scenario 3 may not start at zero NMR signal intensity. The initial intensity can vary depending on how much gas is left in the pore spaces. The initial intensity can be calibrated using the background measurement described above to provide the gas pressure at time zero, similar to what was done for scenario 2.

In another embodiment the desired pressure $P_2$ is not kept constant. For example, $P_2$ may be set at a particular value and time-dependent NMR measurements performed. Then $P_2$ can be reduced to reverse the flow of gas. That is, the gas moves from pores 240 into cavity 160, leading to a NMR signal that decreases with time. Alternatively, $P_2$ can be increased, causing an increase in the NMR signal intensity as a function of time. Many combinations of $P_2$ and the pressure in pores 240 can be chosen to further investigate the permeability and pressure of the formation.

Figure 5:
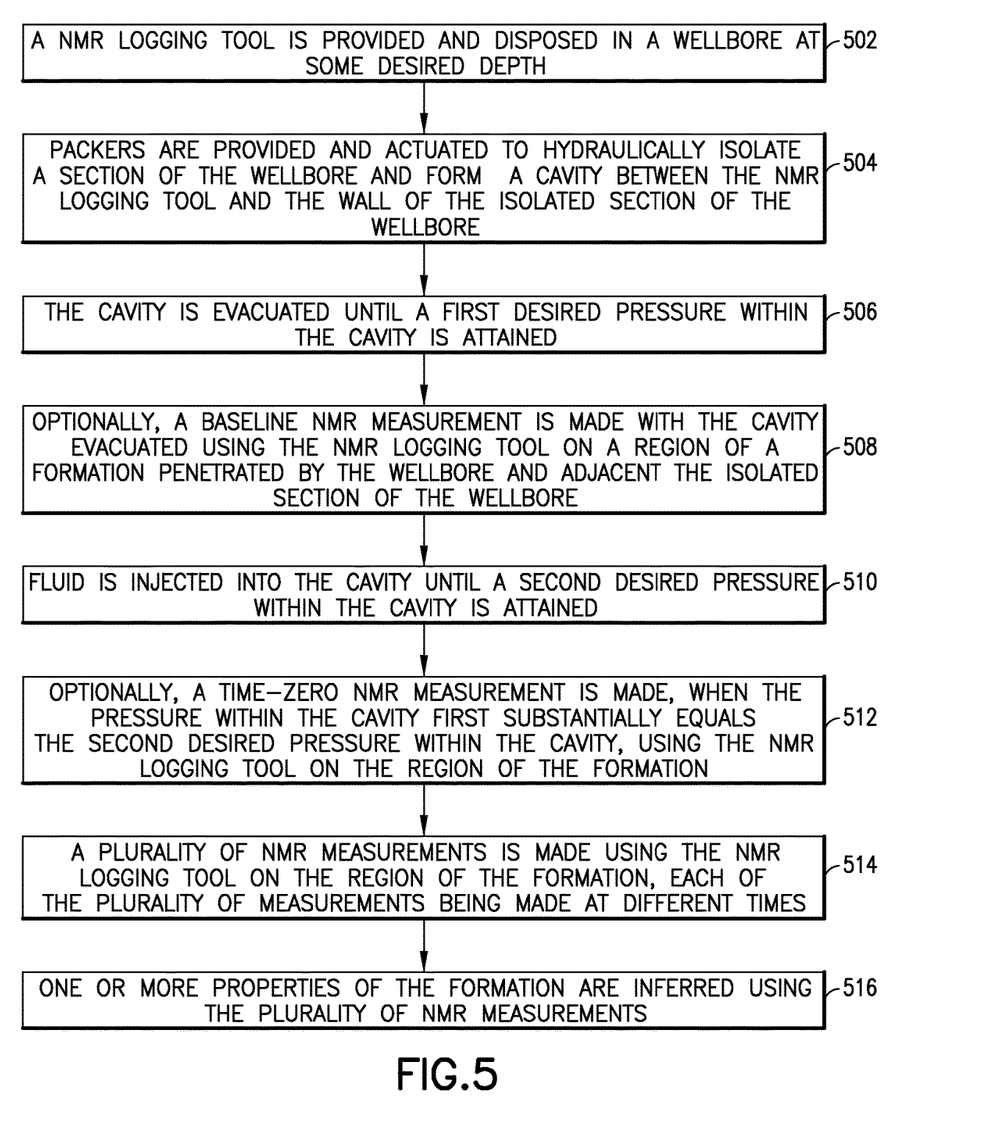
FIG. 5 is a flowchart for determining the permeability and/or pore pressure of a rock (formation) based on its time-dependent NMR response, in accordance with the present disclosure.

FIG. 5 is a flowchart for one embodiment to infer one or more properties of a formation using one or more NMR measurements. A NMR logging tool is provided and disposed in a wellbore at some desired depth (502). Packers are provided and actuated to hydraulically isolate a section of the wellbore and form a cavity between the NMR logging tool and the wall of the isolated section of the wellbore (504). The cavity is evacuated until a first desired pressure within the cavity is attained (506) and, optionally, a baseline NMR measurement is made with the cavity evacuated using the NMR logging tool on a region of a formation penetrated by the wellbore and adjacent the isolated section of the wellbore (508). Fluid is injected into the cavity until a second desired pressure within the cavity is attained (510). Optionally, a time-zero NMR measurement is made, when the pressure within the cavity first substantially equals the second desired pressure within the cavity, using the NMR logging tool on the region of the formation (512). A plurality of NMR measurements is made using the NMR logging tool on the region of the formation, each of the plurality of measurements being made at different times (514). One or more properties of the formation are inferred using the plurality of NMR measurements (516).

Figure 6:
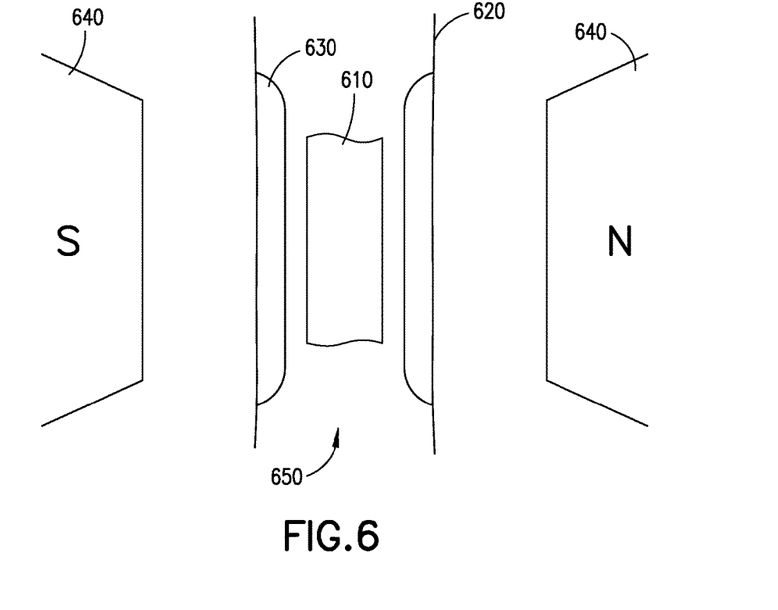
FIG. 6 is a schematic drawing of a sample being investigated using a NMR tool disposed in a laboratory, in accordance with the present disclosure.

In another embodiment core plugs cut from the formation are investigated in a laboratory. FIG. 6 shows a core plug 610 encased in a non-conductive pressure housing 620, pressure sealed using an inflatable rubber sleeve 630. Rubber sleeve 630 is commonly used in the art of core flooding and allows core plug 610 to be inserted before rubber sleeve 630 is inflated. Air is injected at high pressure to inflate rubber sleeve 630 which contacts the sides (cylindrical surface) of core plug 610 and seals against it, causing a pressure isolation between the two ends of core plug 610. The core plug 610, pressure housing 620, and the rubber sleeve 630 are located within the sensitive region of a laboratory NMR instrument having DC magnets 640. The NMR instrument provides RF antennas and the standard NMR measurement circuitry (not shown). A desired gas pressure $P_2$ is applied to one end 650 of core plug 610 and a NMR signal is recorded as a function of time in a similar manner as described above. Thus, using this set-up, all the scenarios described above for a downhole environment can be re-created in the laboratory and corresponding measurements and analyses can be made and performed.

Some of the methods and processes described above, including processes, as listed above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, as listed above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the embodiments described above particularly pertain to the oil and gas industry, this disclosure also contemplates and includes potential applications such as underground water detection, geology, monitoring of water content (e.g., landfill leak), environmental spill monitoring, conventional well logging, unconventional well logging, and wherever a long-term monitoring tool for water- or oil-bearing material is required. By "unconventional well logging" we mean well logging in "tight" formations such as shales or low permeability carbonates. At least some of those applications involve measurements made over a relatively extended time to investigate slowly varying parameters.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method, comprising:
   providing a nuclear magnetic resonance (NMR) logging tool and disposing the NMR logging tool in a wellbore traversing a formation at some desired depth adjacent a low-permeability portion of the formation;
   providing an upper packer and a lower packer;
   actuating the upper packer and the lower packer to hydraulically isolate a section of the wellbore adjacent the low permeability portion of the formation and form a cavity between the NMR logging tool and the wall of the isolated section of the wellbore;
   evacuating the cavity until a first desired pressure within the cavity is attained;
   injecting gas into the cavity until a second desired pressure within the cavity is attained, said second desired pressure being different than said first desired pressure;
   making a plurality of NMR measurements using the NMR logging tool on a region of the formation penetrated by the wellbore and adjacent the isolated section of the wellbore, each of the plurality of measurements being made at different times; and
   inferring one or more properties of the formation using the plurality of NMR measurements.

2. The method of claim 1, wherein the one or more properties of the formation are selected from the group consisting of permeability and pore pressure.

3. The method of claim 1, wherein the plurality of NMR measurements yields results that are substantially the same and the inferring comprises concluding a pore pressure is substantially equal to the second desired pressure.

4. The method of claim 1, wherein said injecting gas comprises injecting gas at a pressure higher than said first desired pressure, and wherein said making a plurality of NMR measurements comprises tracking an increase in NMR signal intensities.

5. The method of claim 4, further comprising:
   determining a time-dependent pressure difference between a time-dependent pore pressure and the initial pore pressure; and
   determining a permeability k using the determined time-dependent pressure difference according to $k=(1/(P1-P0))(1/m)[(d/dt)S]$ where P0 is said first desired pressure, P1 is said second desired pressure, S is an intensity of said NMR measurements, and m is a proportionality constant.

6. The method of claim 1, further comprising producing a family of NMR signal intensity curves by repeating the processes of claim 1 for various values of the second desired pressure that are greater than an initial pore pressure.

7. The method of claim 1, wherein the plurality of measurements show a time-dependence in which NMR signal intensities decrease with time and the inferring comprises concluding a pore pressure was initially greater than the second desired pressure.

8. The method of claim 7, further comprising:
determining a time-dependent pressure difference between a time-dependent pore pressure and the initial pore pressure; and
determining a permeability using the determined time-dependent pressure difference.

9. The method of claim 7, wherein the second desired pressure is increased and a further plurality of measurements are taken until the further plurality of measurements indicate the NMR signal intensities are increasing with time.

10. The method of claim 1, further comprising producing a family of NMR signal intensity curves by repeating the processes of claim 1 for various values of the second desired pressure that are less than an initial pore pressure.

11. The method of claim 1, wherein the making a plurality of measurements includes making in situ, real-time measurements.

12. The method of claim 1, further comprising repeating the processes of claim 1 using various values for the second desired pressure that are greater than or less than the initial value of the desired second pressure.

13. The method of claim 1, further comprising making a baseline NMR measurement with the cavity evacuated.

14. The method of claim 1, further comprising making a time-zero NMR measurement when the pressure within the cavity first substantially equals the second desired pressure within the cavity.

15. The method of claim 1, wherein the one or more inferred formation properties provide information relevant to one or more applications selected from the group consisting of underground water detection, geology, monitoring of water content, environmental spill monitoring, monitoring water- or oil-bearing material, conventional well logging, and unconventional well logging.

16. A system, comprising:
a nuclear magnetic resonance (NMR) logging tool disposed in a wellbore traversing a formation at some desired depth adjacent a low-permeability portion of the formation;
an upper packer and a lower packer, said NMR logging tool having at least one valve between said upper packer and said lower packer;
a source of pressurized gas; and
a processor located at the earth's surface or carried on the NMR logging tool configured for:
actuating the upper packer and the lower packer to hydraulically isolate a section of the wellbore adjacent the low-permeability portion of the formation and form a cavity between the NMR logging tool and the wall of the isolated section of the wellbore;
evacuating the cavity through the at least one valve until a first desired pressure within the cavity is attained;
injecting the pressurized gas through the at least one valve into the cavity until a second desired pressure within the cavity is attained, said second desired pressure being different than said first desired pressure;
making a plurality of NMR measurements using the NMR logging tool on a region of the formation penetrated by the wellbore and adjacent the isolated section of the wellbore, each of the plurality of measurements being made at different times; and
inferring one or more properties of the formation using the plurality of NMR measurements.

17. The system of claim 16, wherein the at least one valve of the NMR logging tool further comprises an evacuation valve and an injection valve.

18. The system of claim 16, wherein the one or more properties of the formation are selected from the group consisting of permeability and pore pressure.

19. The system of claim 16, wherein the plurality of NMR measurements yield results that are substantially the same and the inferring comprises concluding a pore pressure is substantially equal to the second desired pressure.

20. The system of claim 16, wherein the plurality of measurements show a time-dependence in which NMR signal intensities increase with time and the inferring comprises concluding an initial pore pressure was less than the second desired pressure.

21. The system of claim 16, wherein the plurality of measurements show a time-dependence in which NMR signal intensities decrease with time and the inferring comprises concluding a pore pressure was initially greater than the second desired pressure.

22. The system of claim 16, wherein said one or more properties includes permeability k, and said processor infers k according to $k=(1/(P1-P0))(1/m)[(d/dt)S]$ where P0 is said first desired pressure, P1 is said second desired pressure, S is an intensity of said NMR measurements, and m is a proportionality constant.

23. The system of claim 16, wherein the one or more inferred formation properties provide information relevant to one or more applications selected from the group consisting of underground water detection, geology, monitoring of water content, environmental spill monitoring, monitoring water- or oil-bearing material, conventional well logging, and unconventional well logging.

* * * * *